UNITED STATES PATENT OFFICE.

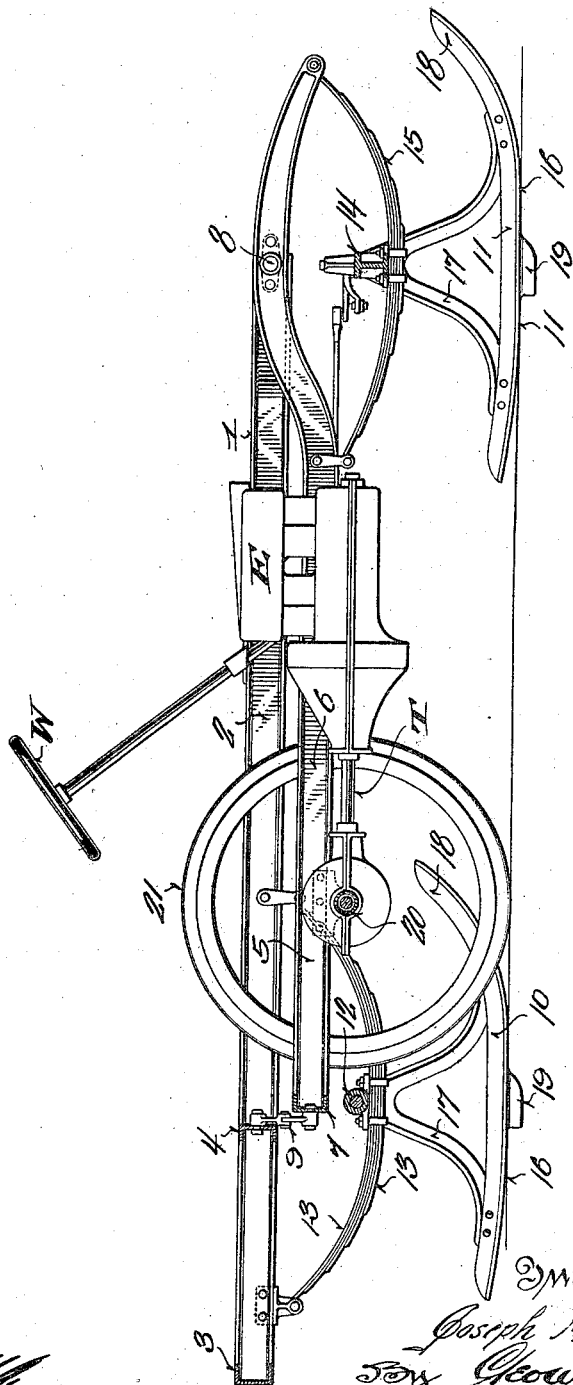

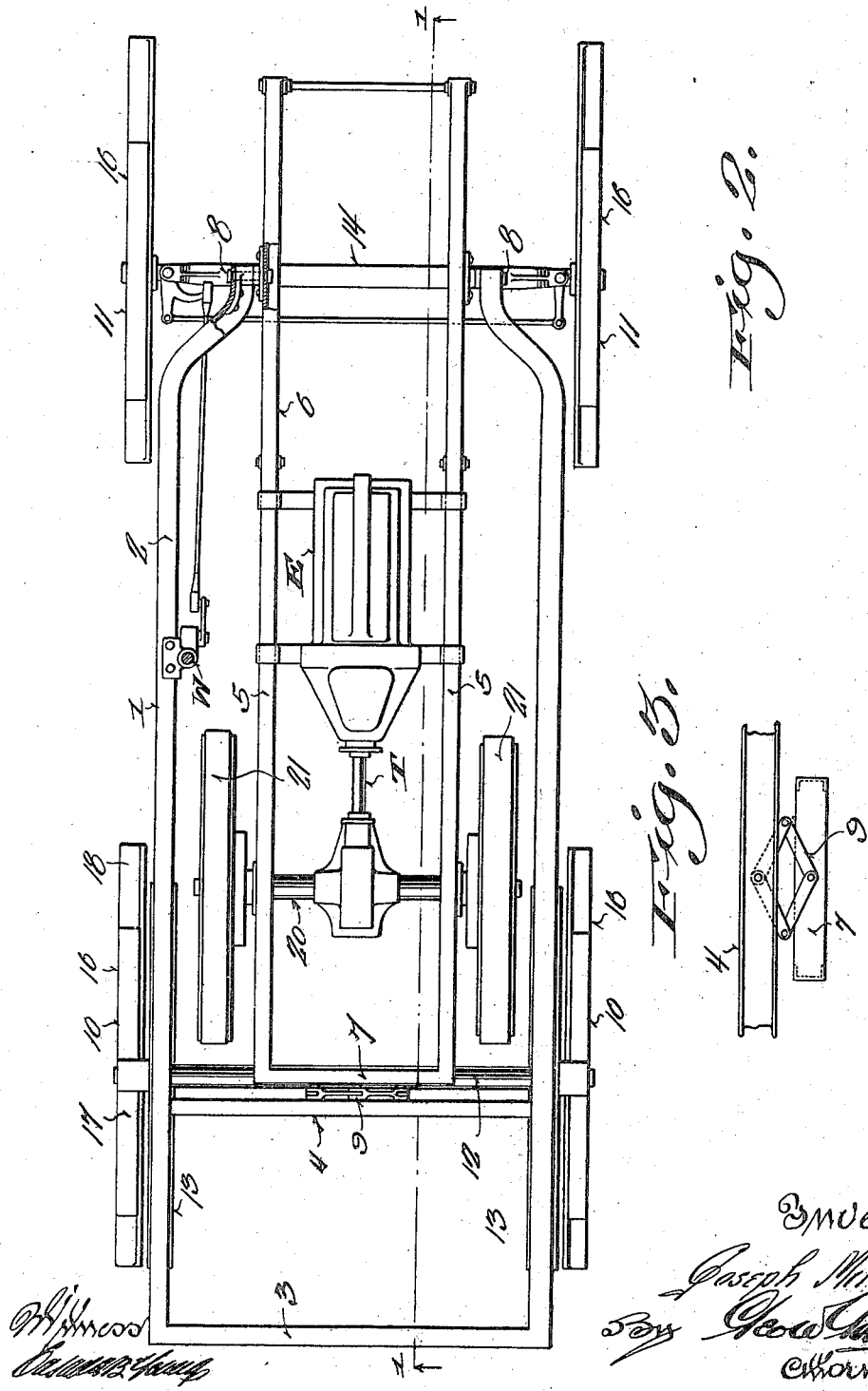

JOSEPH MILLER, OF HARTFORD, WISCONSIN.

MOTOR-DRIVEN SLEIGH.

1,242,963.

Specification of Letters Patent.

Patented Oct. 16, 1917.

Application filed February 12, 1917. Serial No. 147,996.

*To all whom it may concern:*

Be it known that I, JOSEPH MILLER, a citizen of the United States, and resident of Hartford, in the county of Washington and State of Wisconsin, have invented certain new and useful Improvements in Motor-Driven Sleighs; and I do hereby declare that the following is a full, clear, and exact description thereof.

This invention relates to new and useful improvements in sleighs, particularly those which carry their own motive power.

The primary object of the invention is to provide a machine of this character which is so constructed that the traction means therefor will continuously be in engagement with the ground, even though the runners are moved above the surface thereof owing to the unevenness of the road bed.

In carrying out this general object a pair of supporting frames is used, one being hinged to the other, the main frame supporting the weight of the body of the vehicle, while the supplemental frame carries the traction means.

The preferred form of my invention is shown in the accompanying drawings and will be hereinafter more particularly described and claimed.

In the drawings:

Figure 1 represents a central vertical longitudinal section through the machine, constructed in accordance with my invention, the usual body having been removed, said section being taken on the plane of the line 1—1 of Fig. 2.

Fig. 2 is a plan view of the parts shown in Fig. 1, parts being broken away and in section.

Fig. 3 is a detail transverse section showing the linked connection between the two frames.

Referring now more particularly to the several figures of the drawings wherein similar reference characters designate like parts, the numeral 1 indicates a main frame formed of a pair of channeled side bars 2 and a pair of similarly shaped cross bars 3 and 4, the bar 3 connecting the rear ends of the side bars and the bar 4 connecting the intermediate portions thereof. The bar 4, however, is disposed adjacent the rear end of the frame as clearly illustrated in Figs. 1 and 2.

A supplemental frame 5 consisting of the side bars 6 and the cross bar 7 is pivoted between the side 2 of the main frame. Suitable pivotal connections 8 are provided for this purpose. The length of the side bars of the supplemental frame is substantially equal to that of the side bars of the main frame, but the front ends of the first mentioned bars project beyond the adjacent ends of the other bars a distance approximately equal to the distance between the cross bars 3 and 4, the cross bar 7 being positioned in close proximity to said bar 4. The supplemental frame is positioned in a plane below that of the main frame therefore the front ends of the side bars of said supplemental frame are bent upwardly so that they will be in approximately the same planes as the forward ends of the side bars of the main frame. This allows the forward ends of these bars to be readily connected by the pivotal connections 8. The rear ends of these side bars which are connected together by the cross bar 7 are loosely connected with the main frame by a suitable toggle link construction. This connection is formed by a pair or more of links 9 which are pivoted together and have their opposite ends similarly connected with the cross bars 4 and 7 respectively. When two pairs of links are employed their outer ends are preferably pivoted together and to the bars as shown in Fig. 3. By this construction it will be noted that the rear end of the supplemental frame has a limited movement with respect to the main frame.

The frame 1 is adapted to carry a body of suitable construction, and is in turn supported by runners 10 and 11, the rear runners, which are designated by the numeral 10 are mounted upon an axle 12, the same being clipped to a pair of spring suspension devices 13. The suspension devices are preferably in the form of ordinary semi-elliptical leaf springs which are connected by their opposite ends to the side bars of the main frame. The front runners 11 are so mounted upon the ends of an axle 14 that they may be moved through the medium of a steering apparatus controlled by the steering wheel W. This steering mechanism may be similar to that which is ordinarily employed on automobiles. The axle 14 is also supported by semi-elliptical leaf springs 15, these springs, however, being fixed to the forward ends of the side bars 6 of the supplemental frame. But, since these ends of the side bars of the supplemental frame are connected to the forward ends of the side bars of the main frame, the latter will support practically all the weight at the forward end of the machine.

The runners 10 and 11 may be of any preferable or suitable formation, they being shown in the present instance as composed of shoes 16 connected to the ends of the arms of substantially V-shaped brackets 17. The forward ends of the shoes are bent upwardly as illustrated in Fig. 1 at 18, so that the runners will readily glide over the surface of the ground. Each of the shoes is preferably provided with a rib or cleat 19 which extends longitudinally thereof and is adapted to bite into the snow or ice to prevent the vehicle from sliding laterally or skidding.

To propel the vehicle, a suitable power plant is suspended between the side bars of the supplemental frame 5, said plant including any preferred form of internal combustion or other type of engine E, and a transmission mechanism T for conveying power from the plant to a supplemental axle 20 mounted in brackets on the side bars of the supplemental frame adjacent the rear end thereof. This axle has traction wheels 21 mounted on its opposite ends, said wheels being of any preferable diameter and having any convenient form of tread for effectively gripping the ice or snow. From Fig. 2 it is seen that the wheels 21 are disposed between the side bars 2 and 6 and are of such width that a considerable traction surface is provided. In order to accommodate the wheel between the side bars of the two frames it is necessary to make the supplemental frame considerably narrower than the main frame.

From the foregoing it will be seen that because of the weight of the power plant and the peculiar connection between the main and supplemental frames, the peripheries of the traction wheel 21 will practically always be in contact with the surface of the ground, or the snow or ice covering the same. It is well known that because of the unevenness in the road bed the wheels of a vehicle will frequently leave the surface thereof, especially when the vehicle is running at a high rate of speed. This is not only detrimental to the tires of a vehicle but will also seriously affect the other parts of the machine. In constructing my invention this difficulty is overcome by providing a pair of frames, one of which is movable independently of the other. Although runners are illustrated as used in connection with the improved parts of my machine, it is obvious that the same would operate equally well if ordinary automobile or vehicle wheels were used, therefore, briefly stated, my invention has improved the ordinary self driven vehicle by providing a separate supporting element for the traction means and a similar element for the wheels or runners which support the entire weight of the vehicle and engage the ground.

Many minor changes might well be made in the form and proportion of the several parts of the invention in constructing vehicles of various sizes and styles. For which reason I do not wish to be limited to the exact construction illustrated in the accompanying drawings, but only in so far as the following claims will limit the scope of the invention.

It will be readily seen that where bare ground is encountered it would afford great difficulty in propelling a vehicle of the class described where the runners are used, to avoid this any suitable lever means might be used to shift the weight of the load from the main frame to that of the supplemental frame which carries the traction wheels. This lever arrangement may be operated by a foot pedal or suitable lever within the manual control of the operator.

I claim:—

1. In a machine of the class described, a main frame, a supplemental frame pivoted at one end adjacent one end of the main frame, a pair of links pivoted together at one end, the opposite ends being pivoted respectively to the main frame and the supplemental frame at a point remote from the pivoted end thereof, supporting members connected with one of said frames for engagement with the ground, and supporting and traction means carried by the other frame for propelling the machine.

2. In a machine of the class described, a main frame comprising a pair of side bars, a cross bar connecting the same adjacent one end, a supplemental frame comprising a pair of side bars and cross bars connecting the ends of said side bars, the side bars of the supplemental frame being pivoted adjacent one end at the ends of the side bars of the main frame, toggle links connecting one cross bar of the supplemental frame and the cross bar of the main frame, supporting members connected with one of said frames for engagement with the ground, and supporting and traction means carried by the other frame for propelling the machine.

3. In a machine of the class described a main frame comprising a pair of side bars, and a cross bar connecting the same adjacent one end, a supplemental frame comprising a pair of side bars and cross bars connecting the ends of said side bars, the side bars of the supplemental frame being pivoted adjacent one end at the ends of the side bars of the main frame, toggle links connecting one cross bar of the supplemental frame with that of the main frame, supporting members connected with the main frame for engagement with the ground, traction wheels carried by the other frame for engagement with the ground disposed between the side bars of said frames, and means for operating said traction wheels.

4. In a machine of the class described, a main frame, a supplemental frame pivoted at one end adjacent one end of the main frame, a pair of links pivoted together at one end, a second pair of links pivoted together at one end, the free ends of the pairs of links being pivoted together and to the main frame and supplemental frame, respectively at a point remote from the pivoted end of the latter, supporting members connected with one of said frames for engagement with the ground, and supporting and traction means carried by the other frame for supporting the same and propelling the machine.

In testimony that I claim the foregoing I have hereunto set my hand at Milwaukee, in the county of Milwaukee and State of Wisconsin.

JOSEPH MILLER.

Copies of this patent may be obtained for five cents each, by addressing the "Commissioner of Patents, Washington, D. C."